(12) United States Patent
Chauhan et al.

(10) Patent No.: US 11,799,971 B2
(45) Date of Patent: Oct. 24, 2023

(54) SYSTEMS AND METHODS FOR SESSION MIGRATION BETWEEN DEVICES

(71) Applicant: Bank of America Corporation, Charlotte, NC (US)

(72) Inventors: Sandeep Kumar Chauhan, Telangana (IN); Sneha Padiyar, Mumbai (IN); Eshita Gupta, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/674,431

(22) Filed: Feb. 17, 2022

(65) Prior Publication Data

US 2023/0262133 A1    Aug. 17, 2023

(51) Int. Cl.
| | |
|---|---|
| *H04L 67/146* | (2022.01) |
| *H04L 67/148* | (2022.01) |
| *H04L 41/22* | (2022.01) |
| *H04L 67/00* | (2022.01) |
| *H04L 67/55* | (2022.01) |

(52) U.S. Cl.
CPC ............ *H04L 67/146* (2013.01); *H04L 41/22* (2013.01); *H04L 67/148* (2013.01); *H04L 67/34* (2013.01); *H04L 67/55* (2022.05)

(58) Field of Classification Search
CPC ..... H04L 67/146; H04L 67/148; H04L 67/34; H04L 67/55; H04L 41/22
USPC ........................................................ 709/203
See application file for complete search history.

(56) References Cited

U.S. PATENT DOCUMENTS

| | | |
|---|---|---|
| 7,254,634 B1 | 8/2007 | Davis et al. |
| 7,437,023 B2 | 10/2008 | King et al. |
| 7,657,639 B2 | 2/2010 | Hinton |
| 7,747,754 B2 | 6/2010 | Kulaskar et al. |
| 7,813,822 B1 | 10/2010 | Hoffberg |
| 7,970,664 B2 | 6/2011 | Linden et al. |
| 8,051,180 B2 | 11/2011 | Mazzaferri et al. |
| 8,074,262 B2 | 12/2011 | Scarlata |
| 8,200,775 B2 | 6/2012 | Moore |
| 8,214,492 B2 * | 7/2012 | Chauvin ............. G06F 11/0757 709/224 |
| 8,230,383 B2 | 7/2012 | Krebs |
| 8,280,978 B2 | 10/2012 | Ansari et al. |
| 8,291,238 B2 | 10/2012 | Ginter et al. |
| 8,429,630 B2 | 4/2013 | Nickolov et al. |
| 8,449,471 B2 | 5/2013 | Tran |
| 8,468,244 B2 | 6/2013 | Redlich et al. |

(Continued)

*Primary Examiner* — Zi Ye

(57) ABSTRACT

A system includes a memory and a processor. The processor is configured to determine that a user has ceased using a first device while the user was in an active user session with an application. The processor is further configured to determine a last user interface with which the user interacted on the first device and to determine user-supplied information from the last user interface. The processor is further configured to determine that the user is attempting to start a new user session with the application on a second device, and in response, display a message on the second device inquiring if the user wishes to continue with the last user interface. The processor is further configured to display a new user interface on the second device that corresponds to the last user interface and display the user-supplied information from the last user interface in the new user interface.

17 Claims, 3 Drawing Sheets

(56) References Cited

U.S. PATENT DOCUMENTS

| | | |
|---|---|---|
| 8,527,640 B2 | 9/2013 | Reisman |
| 8,549,410 B2 | 10/2013 | Hoyle |
| 8,560,366 B2 | 10/2013 | Mikurak |
| 8,626,667 B2 | 1/2014 | Walker et al. |
| 8,635,396 B2 | 1/2014 | Dow et al. |
| 8,676,833 B2 | 3/2014 | Chunilal |
| 8,732,026 B2 | 5/2014 | Caballero et al. |
| 8,880,704 B2 | 11/2014 | Kuglick |
| 8,892,446 B2 | 11/2014 | Cheyer et al. |
| 8,904,181 B1 | 12/2014 | Felsher et al. |
| 9,001,682 B2 | 4/2015 | Kovvali et al. |
| 9,104,739 B2 | 8/2015 | Liang et al. |
| 9,130,903 B2 | 9/2015 | Ryman |
| 9,179,316 B2 | 11/2015 | Raleigh |
| 9,210,100 B2 | 12/2015 | Van Der Linden et al. |
| 9,277,017 B2 | 3/2016 | Burch et al. |
| 9,403,095 B2 | 8/2016 | Dale et al. |
| 9,484,077 B2 | 11/2016 | Reisman |
| 9,560,147 B2 | 1/2017 | Shaheen et al. |
| 9,727,876 B2 | 8/2017 | Stefik et al. |
| 9,762,494 B1 | 9/2017 | Mehta et al. |
| 9,894,049 B2 | 2/2018 | Sample et al. |
| 9,901,252 B2 | 2/2018 | Tran |
| 10,009,335 B2 | 6/2018 | Mathew et al. |
| 10,013,705 B2 | 7/2018 | Mikurak |
| 10,051,527 B2 | 8/2018 | John et al. |
| 10,057,239 B2 | 8/2018 | Chickering |
| 10,083,056 B2 | 9/2018 | Thomas et al. |
| 10,159,022 B2 | 12/2018 | Senarath et al. |
| 10,382,426 B2 | 8/2019 | Falodiya |
| 10,412,050 B2 | 9/2019 | Reddy et al. |
| 10,523,545 B2 | 12/2019 | Haraszti et al. |
| 10,630,779 B2 | 4/2020 | Haraszti et al. |
| 10,698,923 B2 | 6/2020 | Martin et al. |
| 10,838,775 B2 | 11/2020 | Das et al. |
| 2006/0184535 A1* | 8/2006 | Kaluskar .............. G06F 16/21 |
| 2009/0138606 A1* | 5/2009 | Moran .................. H04L 67/14 709/227 |
| 2010/0279706 A1* | 11/2010 | Dicke .................. H04W 4/02 455/456.1 |
| 2014/0359637 A1* | 12/2014 | Yan ...................... G06F 9/4856 718/108 |
| 2016/0173617 A1* | 6/2016 | Allinson ............. H04L 67/148 709/227 |
| 2021/0099868 A1 | 4/2021 | Damlaj et al. |

* cited by examiner

SYSTEMS AND METHODS FOR SESSION MIGRATION BETWEEN DEVICES

TECHNICAL FIELD

The present disclosure relates generally to application user sessions, and more specifically to systems and methods for session migration between devices.

BACKGROUND

A user session is period of time in which a user interacts with an application running on a computing device. During a user session, a user receives information from the application and may provide information to the application using various user inputs. Typically, a user session remains active (i.e., the user is permitted to interact with the application) for a set amount of time, until the user ceases interacting with the application for a certain amount of time, or the computing device is turned off or locked. Once a user session ends, a user may lose any information they entered in a user interface during the user session. In addition, it may be difficult and time consuming for a user to return to the last user interface they interacted with during the user session after the user sessions ends.

SUMMARY

A user session is period of time in which a user interacts with an application running on a computing device. During a user session, a user receives information from the application and may provide information to the application using various user inputs. Typically, a user session remains active (i.e., the user is permitted to interact with the application) for a set amount of time, until the user ceases interacting with the application for a certain amount of time, or the computing device is turned off or locked. Once a user session ends, a user may lose any information they entered in a user interface during the user session. In addition, it may be difficult and time consuming for a user to return to the last user interface they interacted with during the user session after the user sessions ends.

To address these and other problems with existing user sessions, this disclosure contemplates systems and methods for user session migration between multiple computing devices. For example, a user may begin a user session on a laptop computer where the user views a user interface of a web browser and begins providing information in the user interface. If the user ceases using the laptop computer during the active user session (e.g., because the laptop computer runs out of power, the user has to abruptly leave, etc.), the systems and methods described herein may detect that the user has ceased using the laptop computer during the active user session and provide the opportunity for the user to continue the user session on another computing device. For example, a push notification may be sent to the user's smartphone that will allow the user to continue viewing the last user interface of the web browser on the smartphone, and any information entered into the last user interface on the user's laptop computer will be automatically populated in the user interface on the user's smartphone. As a result, user sessions may be automatically migrated between multiple computing devices, thereby reducing system resources (e.g., processor, network, and memory resources) that are typically required when a user has to manually navigate to a previous user interface of a previous user session and then re-enter information that they previously entered in the user interface.

In one embodiment, a system includes a memory and a processor. The processor is configured to determine that a user has ceased using a first device while the user was in an active user session with an application on the first device. The processor is further configured to determine a last user interface with which the user interacted on the first device and to determine user-supplied information associated with the last user interface. The processor is further configured to determine that the user is attempting to start a new user session with the application on a second device, and in response, display a message on the second device inquiring if the user wishes to continue with the last user interface. The processor is further configured to, in response to an indication that the user wishes to continue with the last user interface, display a new user interface on the second device that corresponds to the last user interface and display the user-supplied information from the last user interface in the new user interface.

A practical application of the systems and methods described herein is that user application sessions may be automatically migrated between multiple computing devices. For example, a user may begin a session on one device (e.g., filling out a webpage form on a smartphone) and then continue the session on another device (e.g., filling out the same webpage form on a smartwatch) without being required to navigate back to the previous webpage and without having to re-enter information that was entered in the previous session. By automatically migrating user sessions between multiple computing devices, an organization's computing systems may operate more efficiently by avoiding the increased use of computing resources (e.g., processor, network, and memory resources) associated with users having to manually navigate to prior webpages or mobile application interfaces and then re-enter information that was previously entered.

Embodiments of the present disclosure provide technological solutions to technological problems. For example, the disclosed embodiments may automatically migrate user sessions between multiple computing devices. As a specific example, embodiments may automatically detect that a user has ceased using a first device during an active user session with an application. Once the user attempts to initiate a new user session with the same application on a second device, embodiments may automatically provide a user interface that corresponds to the last interface the user interacted with on the first device. In addition, embodiments may automatically populate the user interface on the second device with any user-supplied information from the last interface. As a result, an organization's computing resources (e.g., processor, network, and memory resources) may be conserved/optimized by not requiring users to manually navigate through multiple webpages or mobile application interfaces on the second device in order to reach the last user interface they interacted with on the first device. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description.

DETAILED DESCRIPTION

A user session is period of time in which a user interacts with an application running on a computing device. During a user session, a user receives information from the application and may provide information to the application using various user inputs. Typically, a user session remains active (i.e., the user is permitted to interact with the application) for a set amount of time, until the user ceases interacting with the application for a certain amount of time, or the computing device is turned off or locked. Once a user session ends, a user may lose any information they entered in a user interface during the user session. In addition, it may be difficult and time consuming for a user to return to the last user interface they interacted with during the user session after the user sessions ends.

To address these and other problems with existing user sessions, this disclosure contemplates systems and methods for user session migration between multiple computing devices. For example, a user may begin a user session on a laptop computer where the user views a user interface of a web browser and begins providing information in the user interface. If the user ceases using the laptop computer during the active user session (e.g., because the laptop computer runs out of power, the user has to abruptly leave, etc.), the systems and methods described herein may detect that the user has ceased using the laptop computer during the active user session and provide the opportunity for the user to continue the user session on another computing device. For example, a push notification may be sent to the user's smartphone that will allow the user to continue viewing the last user interface of the web browser on the smartphone, and any information entered into the last user interface on the user's laptop computer will be automatically populated in the user interface on the user's smartphone. As a result, user sessions may be automatically migrated between multiple computing devices, thereby reducing system resources (e.g., processor, network, and memory resources) that are typically required when a user has to manually navigate to a previous user interface of a previous user session and then re-enter information that they previously entered in the user interface.

Figure 1:
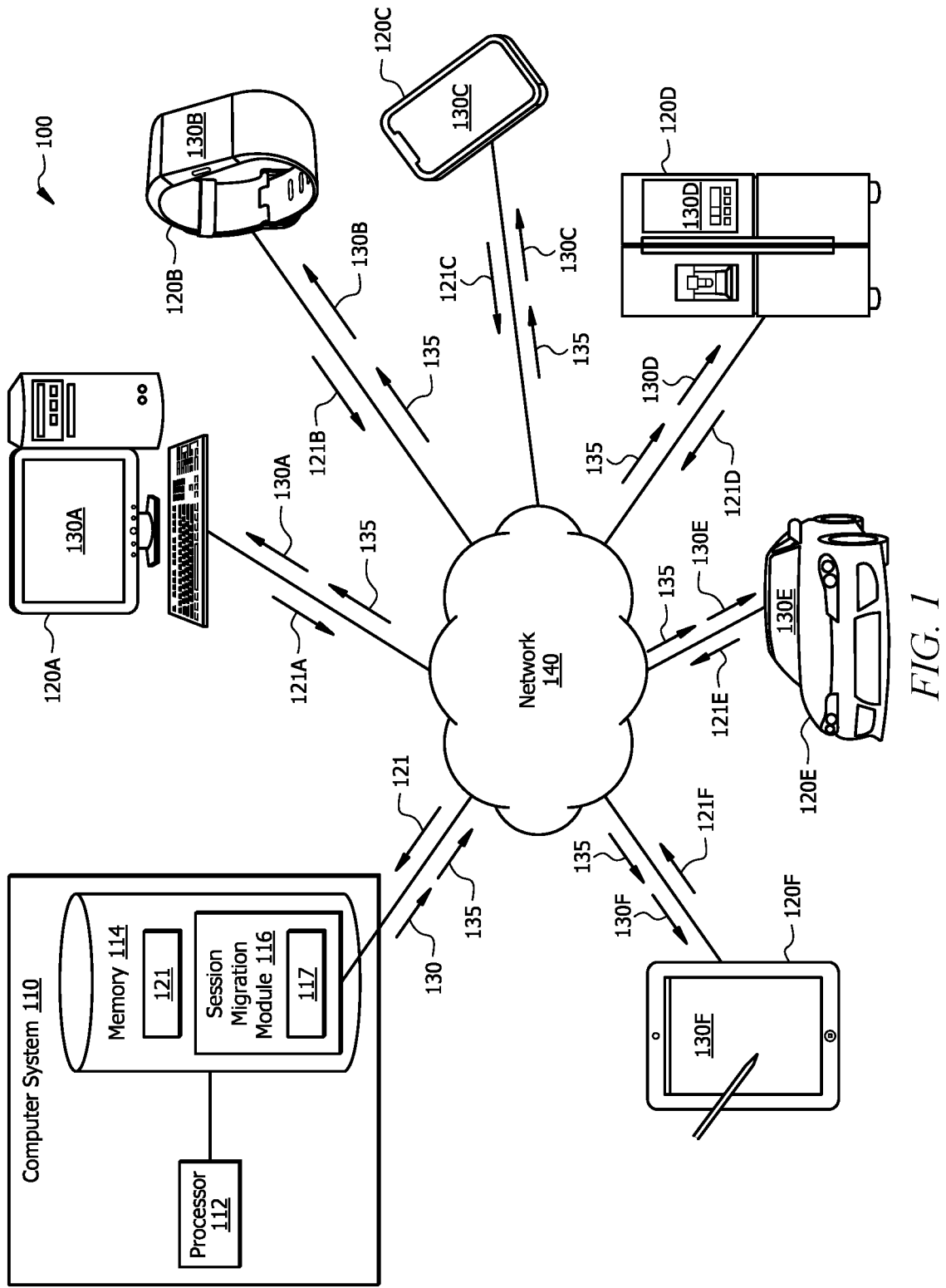
FIG. 1 is a schematic diagram of an example system for user session migration between multiple computing devices, according to certain embodiments.
Figure 2:
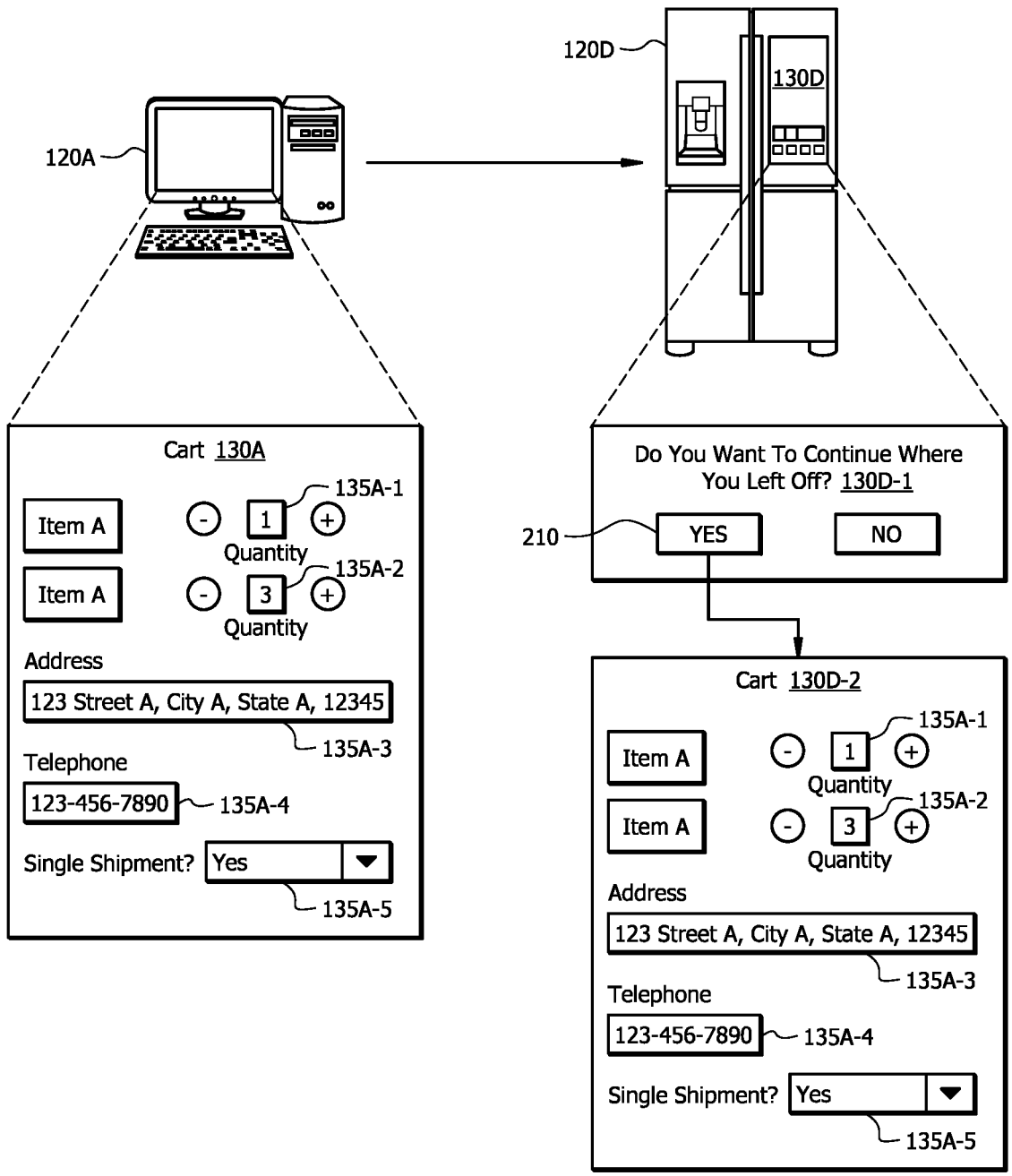
FIG. 2 illustrates example user interfaces that may be displayed by the system of FIG. 1, according to certain embodiments.
Figure 3:
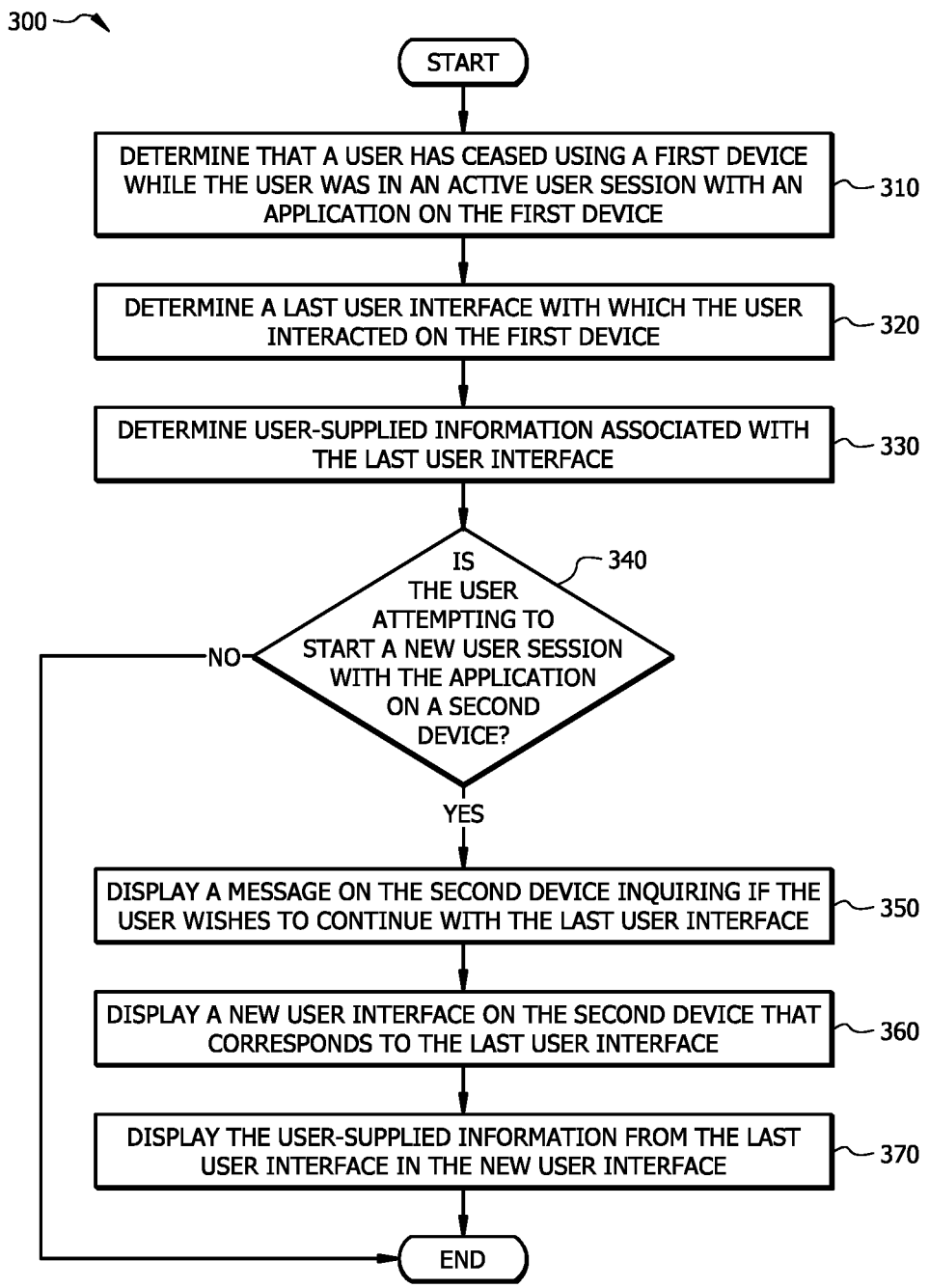
FIG. 3 is a flowchart of a method for user session migration between multiple computing devices, according to certain embodiments.

FIGS. 1 through 3 show example systems and methods for user session migration between multiple computing devices. FIG. 1 illustrates an example system for user session migration between multiple computing devices. FIG. 2 illustrates example user interfaces that may be displayed by the system of FIG. 1. FIG. 3 illustrates an example method for user session migration between multiple computing devices.

FIG. 1 illustrates an example user session migration system 100 that migrates user sessions between multiple user devices 120, according to certain embodiments. User session migration system 100 includes a computer system 110, user devices 120 (e.g., 120A-120F), and a network 140. Computer system 110 is communicatively coupled to user devices 120 via network 140 using any appropriate wired or wireless telecommunication technology.

In general, computer system 110 of user session migration system 100 migrates user sessions between user devices 120. For example, a user may begin a session on a computer 120. For example, the user begins filling out a cart form on user interface 130A) and then continue the session on another device such as smartwatch 120B (e.g., by filling out the same cart form on user interface 130B) without being required to navigate to the previous user interface and without having to re-enter user-supplied information 135 that the user entered in the previous session. To provide such seamless migration of user sessions, computer system 110 may first determine that a user has ceased using a first user device 120 while the user was in an active user session with an application on the first user device 120. For example, computer system 110 may determine that the first user device 120 was locked or powered down during the active user session. Computer system 110 may then determine a last user interface 130 that the user interacted with on the first user device 120 as well as any user-supplied information 135 entered by the user in the last user interface 130. Computer system 110 may then determine that the user is attempting to start a new user session with the application on a second user device 120, and in response, display a message on the second user device 120 inquiring if the user wishes to continue with the last user interface 130. If the user indicates that they wish to continue with the last user interface 130 on the second user device 120 (e.g., by selecting a user-selectable button displayed on the second user device 120), computer system 110 may display a new user interface 130 on the second user device 120 that corresponds to the last user interface 130 (e.g., the same webpage or mobile application interface that was last used by the user on the first user device 120). In addition, computer system 110 may also automatically populate any user-supplied information 135 in the new user interface 130 on the second user device 120 that the user had already submitted in the last user interface 130. As a result, a user session may be automatically migrated across multiple user devices 120, thereby reducing required computing resources (e.g., processor, network, and memory resources) that would otherwise be required without migrating the user session.

Computer system 110 may be any appropriate computing system in any suitable physical form. As example and not by way of limitation, computer system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 110 may include one or more computer systems 110; be unitary or distributed; span multiple locations; span multiple machines; span multiple data centers; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate.

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of computing system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of computer system 110 by processing information received from user devices 120 and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, operational software such as session migration module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Session migration module 116 represents any suitable set of instructions, logic, or code embodied in a computer-readable storage medium. For example, session migration module 116 may be embodied in memory 114, a disk, a CD, or a flash drive. In particular embodiments, session migration module 116 may include instructions 117 (e.g., a software application) executable by processor 112 to perform one or more of the functions described herein. In general, session migration module 116 sends user interface 130 and user-supplied information 135 for display on user device 120 via network 140.

User device 120 is any appropriate device for communicating with components of computer system 110 over network 140. For example, user device 120 may be a desktop computer 120A, a smartwatch 120B, a smartphone 120C, a smart refrigerator 120D (i.e., a refrigerator with a built-in tablet-like computer), an automobile 120E with a built-in computer, a tablet computer 120F, a laptop computer, nd the like. User device 120 may include an electronic display, a processor such processor 112, and memory such as memory 114. The electronic display of user device 120 may display user interface 130 and user-supplied information 135 that is provided by computer system 110.

User session information 121 is data about a user session on user device 120. In some embodiments, user session information 121 includes data that indicates a last user interface 130 that a user interacted with in an active user session (e.g., a URL of the last user interface 130, a unique identifier of the last user interface 130, a timestamp, etc.). In some embodiments, user session information 121 includes user-supplied information 135 that a user entered into a user interface 130. In some embodiments, user session information 121 includes a current geo location of user device 120 or a geo location of user device 120 during the last active user session of a user (e.g., GPS coordinates of user device 120). In some embodiments, user session information 121 includes an amount of time remaining in the last active user session (e.g., an amount of time remaining in the last active user session before the user session was to be terminated). In general, user session information 121 may be generated and transmitted from user device 120 to computer system 110, or in some embodiments may be generated and transmitted to computer system 110 from another computer system that is in communication with user device 120 (e.g., a web server).

User interface 130 is any graphical user interface that may be displayed by an application (e.g., a web browser, a mobile application, etc.) that is running on user device 120. As a specific example, user interface 130 may be an interface for placing an order (e.g., a cart for a grocery store, a restaurant, a retailer, etc.) or for conducting a transaction. User interface 130 may include one or more areas for a user to enter user-supplied information 135. For example, user-supplied information 135 may be data entered by the user into a field such as an address field, a phone number field, and the like. As another example, user-supplied information 135 may be a user selection of an option displayed on user interface 130 (e.g., a drop-down box selection, etc.). Specific examples of user interface 130 and user-supplied information 135 are illustrated in FIG. 2.

Network 140 allows communication between and amongst the various components of user session migration system 100. For example, computing system 110 and user device 120 may communicate via network 140. This disclosure contemplates network 140 being any suitable network operable to facilitate communication between the components of user session migration system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

In operation, computer system 110 of user session migration system 100 migrates user sessions between user devices 120. As a specific example, consider a scenario where a user begins a user session on computer 120A in a first room of their home where the user begins filling out a grocery cart form on user interface 130A. For example, FIG. 2 illustrates a grocery cart form that may be displayed in user interface 130A on computer 120A. During the session, the user may enter various user-supplied information 135 in user interface 130A. For example, the user may select various user-selectable options in user interface 130A (e.g., quantities 135A-1 and 135A-2 of items to order and shipping option 135A-5) and may enter information such as an address 135A-3 or a telephone number 135A-4 in various data fields of user interface 130A. During the active grocery cart session, the user may realize they need to go look in their smart refrigerator 120D that is located in a different room of their home in order to determine which groceries to order. The user may be automatically presented with a user interface 130D-1 on the electronic display of their smart refrigerator 120D that allows the user to continue with the grocery cart session that the user began on computer 120A (e.g., by selecting user option 210). If the user chooses to continue their previous their previous grocery cart session by selecting user option 210, the previous grocery cart form may be displayed in user interface 130D-2 and will be populated with the user-supplied information 135 that the user entered in the previous grocery cart form in user interface 130A. By not requiring a user to navigate to the previous user interface 130A and without requiring a user to re-enter user-supplied information 135 that the user entered in a previous user session, required computing resources (e.g., processor, network, and memory resources) may be reduced over the amount of resources that that would otherwise be required without migrating the user session.

To provide such seamless migration of user sessions, computer system 110 may first determine that a user has ceased using a first user device 120 such as computer 120A while the user was in an active user session with an application (e.g., a mobile application, a web page, etc.) on the first user device 120. For example, computer system 110 may determine by analyzing user session information 121A that user device 120A was locked while the user was in the active user session with the application on user device 120A. As another example, computer system 110 may determine by analyzing user session information 121A that user device 120A was turned off while the user was in the active user session with the application on user device 120A. As another example, computer system 110 may determine by analyzing user session information 121A that user device 120A entered a sleep mode while the user was in the active user session with the application on user device 120A. As another example, computer system 110 may determine by analyzing user session information 121A that the user was inactive on the first device for a predetermined amount of time while the user was in the active user session with the application on user device 120A.

In response to determining that the user has ceased using a first user device 120 while the user was in an active user session with an application on the first user device 120, computer system 110 may determine a last user interface 130 that the user interacted with on the first user device 120 and any user-supplied information 135 entered by the user in last user interface 130. In some embodiments, computer system 110 determines the last user interface 130 and user-supplied information 135 by analyzing user session information 121 received from the first user device 120 or another computing device such as a web server.

In some embodiments, computer system 110 may next determine that the user is attempting to start a new user session with the application on a second device. For example, if the user was using a mobile application on first user device 120 and then begins using the same mobile application on second user device 120, computer system 110 may receive a notification from the mobile application that the user is attempting to use the mobile application. As another example, if the user was logged into a webpage on first user device 120 and then attempts to log on to the same webpage on second user device 120, computer system 110 may receive a notification from the web server that is providing the webpage that the user is attempting to log onto the webpage.

In response to determining that the user is attempting to start a new user session with the application on a second user device 120, some embodiments of computer system 110 may then display a message (e.g., a push notification) on the second user device 120 inquiring if the user wishes to continue with the last user interface 130. For example, computer system 110 may display user interface 130D-1 as illustrated in FIG. 2 that includes an option 210 that the user may select in order to continue with the last user interface 130. If the user selects to continue with the last user interface 130, computer system 110 may display a new user interface 130 that corresponds to the last user interface 130 and may display the user-supplied information 135 from the last user interface 130 in the new user interface 130. For example, if the user was viewing a certain webpage and had entered user-supplied information 135 in the webpage, the same webpage may be displayed on the second user device 120 and the user-supplied information 135 may be automatically populated on the webpage.

In some embodiments, once a user session is migrated from a first user device 120 to a second user device 120, computer system 110 may limit the new user session on the second user device 120 to the amount of time that was remaining in the first user session on the first device. Typically, a user session has a finite time limit. For example, a user session with a particular mobile application may be limited to thirty minutes total before the user is automatically logged out and required to re-authenticate. Using this example, if computer system 110 determines from user session information 121 that there were ten minutes remaining in the user session on the first user device 120 when then user ceased using the first user device 120, any new user session that is migrated to a second user device 120 may be limited to ten minutes before the user is automatically logged out and required to re-authenticate.

In some embodiments, computer system 110 may analyze geo locations (e.g., GPS coordinates) of user devices 120 before migrating user sessions from one user device 120 to another. For example, computer system 110 may only display a message on a second user device 120 inquiring if the user wishes to continue with the last user interface 130 when the second user device 120 is within a predetermined distance of the first device. As a specific example, computer system 110 may only migrate a user session from a first user device 120 to a second user device 120 when the devices are within one hundred feet of each other. This may prevent unauthorized or unintended session migrations and may increase security of user sessions.

In some embodiments, computer system 110 may display a message on one or more second user devices 120 inquiring if the user wishes to continue with the last user interface 130 without first determining that the user is attempting to start a new user session with the application on a second user device 120. In these embodiments, computer system 110 may access a list of known user devices 120 that are associated with or registered to a particular user. Once computer system 110 determines that the particular user has ceased using a first user device 120 during an active user session, computer system 110 may immediately send messages (e.g., push notifications) to every other user device 120 that is associated with or registered to the particular user. In some embodiments, geo locations (as described above) may also be used by these embodiments to determine which user devices 120 should receive the push notifications.

FIG. 3 illustrates an example method 300 for migrating user sessions between multiple devices, according to certain embodiments. At operation 310, method 300 determines that a user has ceased using a first device while the user was in an active user session with an application on the first device. In some embodiments, the first device is any user device 120. In some embodiments, the application is a mobile application or a webpage. In some embodiments, operation 310 includes determining that the first device was locked while the user was in the active user session with the application on the first device. In some embodiments, operation 310 includes determining that the first device was turned off while the user was in the active user session with the application on the first device. In some embodiments, operation 310 includes determining that the first device entered a sleep mode while the user was in the active user session with the application on the first device. In some embodiments, operation 310 includes determining that the user was inactive on the first device for a predetermined amount of time while the user was in the active user session with the application on the first device.

At operation 320, method 300 determines a last user interface with which the user interacted on the first device. In some embodiments, method 300 determines the last user interface with which the user interacted on the first device by analyzing user session information such as user session information 121. In some embodiments, the last user interface is a particular user interface 130 on the first device of operation 310. In some embodiments, the last user interface is a webpage or a user interface of a mobile application.

At operation 330, method 300 determines user-supplied information associated with the last user interface. In some embodiments, the user-supplied information is user-supplied information 135. In some embodiments, the user-supplied information is data entered by the user in a data field on the last user interface. In some embodiments, the user-supplied information is a selection by the user of a user-selectable option on the last user interface (e.g., a drop-down box).

At operation 340, method 300 determines whether the user is attempting to start a new user session with the application on a second device. For example, if the user was using a mobile application on the first user device and then begins using the same mobile application on a second user device, method 300 may receive a notification from the mobile application that the user is attempting to use the mobile application. As another example, if the user was logged into a webpage on the first user device and then attempts to log on to the same webpage on a second user device, method 300 may receive a notification from the web server that is providing the webpage that the user is attempting to log onto the webpage. If method 300 determines in operation 340 that the user is attempting to start a new user session with the application on a second device, method 300 proceeds to operation 350. Otherwise, method 300 may end.

At operation 350, method 300 displays a message on the second device inquiring if the user wishes to continue with the last user interface. In some embodiments, the message is a push notification. In some embodiments, the message includes a user-selectable option (e.g., a button in a graphical user interface) that the user may select to indicate they wish to continue with the last user interface. In some embodiments, method 300 displays the message of operation 350 on the second user device only if the second user device is within a predetermined distance from the first user device.

At operation 360, method 300 displays a new user interface on the second device that corresponds to the last user interface. In some embodiments, operation 360 is performed only after the user selects the option in operation 350 to continue with the last user interface. In some embodiments, the new user interface is the same webpage or mobile application screen of the last user interface. At operation 370, method 300 displays the user-supplied information from the last user interface of operation 330 in the new user interface of operation 360. After operation 360, method 300 may end.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system comprising:
   a memory configured to store session information received from a plurality of devices, the session information comprising data about a plurality of application user sessions on the plurality of devices; and
   a processor communicatively coupled to the memory, the processor configured to:
   determine that a user has ceased using a first device while the user was in an active user session with an application on the first device;
   in response to determining that the user has ceased using the first device while the user was in the active user session with the application on the first device, determine from the session information a last user interface with which the user interacted on the first device;

determine user-supplied information entered by the user in the last user interface;
determine that the user is attempting to start a new user session with the application on a second device;
determine, by analyzing GPS coordinates, whether the second device is within a predetermined geo distance from the first device;
determine an amount of time remaining in the active user session;
in response to determining that that the second device is within the predetermined geo distance from the first device and in response to determining that there is time remaining in the active user session, display a message on the second device inquiring if the user wishes to continue with the last user interface; and
in response to an indication that the user wishes to continue with the last user interface:
  display a new user interface on the second device that corresponds to the last user interface; and
  display the user-supplied information from the last user interface in the new user interface.

2. The system of claim 1, wherein determining that the user has ceased using the first device while the user was in the active user session with the application on the first device comprises:
  determining that the first device was locked while the user was in the active user session with the application on the first device;
  determining that the first device was turned off while the user was in the active user session with the application on the first device;
  determining that the first device entered a sleep mode while the user was in the active user session with the application on the first device; or
  determining that the user was inactive on the first device for the amount of time while the user was in the active user session with the application on the first device.

3. The system of claim 1, wherein the user-supplied information comprises:
  data entered by the user in a data field on the last user interface; or
  a selection by the user of a user-selectable option on the last user interface.

4. The system of claim 1, wherein the first and second devices are each selected from the group consisting of:
  a smartphone;
  a smartwatch;
  a smart refrigerator;
  a laptop computer;
  a desktop computer;
  a tablet computer; and
  an automobile.

5. The system of claim 1, wherein the message displayed on the second device is a push notification.

6. The system of claim 1, the processor further configured to determine a plurality of other devices registered to the user, wherein the message inquiring if the user wishes to continue with the last user interface is sent for display on the plurality of other devices registered to the user in response to determining that the user has ceased using the first device while the user was in the active user session with the application on the first device.

7. A method comprising:
  determining that a user has ceased using a first device while the user was in an active user session with an application on the first device;
  in response to determining that the user has ceased using the first device while the user was in the active user session with the application on the first device, determining a last user interface with which the user interacted on the first device;
  determining user-supplied information entered by the user in the last user interface;
  determining that the user is attempting to start a new user session with the application on a second device;
  determining, by analyzing GPS coordinates, whether the second device is within a predetermined geo distance from the first device;
  determining an amount of time remaining in the active user session;
  in response to determining that that the second device is within the predetermined geo distance from the first device and in response to determining that there is time remaining in the active user session, displaying a message on the second device inquiring if the user wishes to continue with the last user interface; and
  in response to an indication that the user wishes to continue with the last user interface:
    displaying a new user interface on the second device that corresponds to the last user interface; and
    displaying the user-supplied information from the last user interface in the new user interface.

8. The method of claim 7, wherein determining that the user has ceased using the first device while the user was in the active user session with the application on the first device comprises:
  determining that the first device was locked while the user was in the active user session with the application on the first device;
  determining that the first device was turned off while the user was in the active user session with the application on the first device;
  determining that the first device entered a sleep mode while the user was in the active user session with the application on the first device; or
  determining that the user was inactive on the first device for the amount of time while the user was in the active user session with the application on the first device.

9. The method of claim 7, wherein the user-supplied information comprises:
  data entered by the user in a data field on the last user interface; or
  a selection by the user of a user-selectable option on the last user interface.

10. The method of claim 7, wherein the first and second devices are each selected from the group consisting of:
  a smartphone;
  a smartwatch;
  a smart refrigerator;
  a laptop computer;
  a desktop computer;
  a tablet computer; and
  an automobile.

11. The method of claim 7, wherein the message displayed on the second device is a push notification.

12. The method of claim 7, further comprising determining a plurality of other devices registered to the user, wherein the message inquiring if the user wishes to continue with the last user interface is sent for display on the plurality of other devices registered to the user in response to determining that the user has ceased using the first device while the user was in the active user session with the application on the first device.

13. A system comprising:
a memory configured to store session information received from a plurality of devices, the session information comprising data about a plurality of application user sessions on the plurality of devices; and
a processor communicatively coupled to the memory, the processor configured to:
- determine that a user has ceased using a first device while the user was in an active user session with an application on the first device;
- in response to determining that the user has ceased using the first device while the user was in the active user session with the application on the first device, determine from the session information a last user interface with which the user interacted on the first device;
- determine user-supplied information entered by the user in the last user interface;
- determine a plurality of other devices associated with the user;
- determine, by analyzing GPS coordinates, whether the plurality of other devices associated with the user are within a predetermined geo distance from the first device;
- determine an amount of time remaining in the active user session;
- in response to determining that that the plurality of other devices associated with the user are within the predetermined geo distance from the first device and in response to determining that there is time remaining in the active user session, send a message for display on each of other devices associated with the user, the message inquiring if the user wishes to continue with the last user interface; and
- in response to an indication that the user wishes to continue with the last user interface on a particular other device:
  - provide a new user interface for display on the particular other device that corresponds to the last user interface; and
  - provide the user-supplied information from the last user interface for display in the new user interface.

14. The system of claim 13, wherein determining that the user has ceased using the first device while the user was in the active user session with the application on the first device comprises:
- determining that the first device was locked while the user was in the active user session with the application on the first device;
- determining that the first device was turned off while the user was in the active user session with the application on the first device;
- determining that the first device entered a sleep mode while the user was in the active user session with the application on the first device; or
- determining that the user was inactive on the first device for the amount of time while the user was in the active user session with the application on the first device.

15. The system of claim 13, wherein the user-supplied information comprises:
- data entered by the user in a data field on the last user interface; or
- a selection by the user of a user-selectable option on the last user interface.

16. The system of claim 13, wherein the plurality of other devices are each selected from the group consisting of:
- a smartphone;
- a smartwatch;
- a smart refrigerator;
- a laptop computer;
- a desktop computer;
- a tablet computer; and
- an automobile.

17. The system of claim 13, wherein the message is a push notification.

* * * * *